(12) United States Patent
Danilov et al.

(10) Patent No.: US 11,436,231 B2
(45) Date of Patent: Sep. 6, 2022

(54) CONTINUOUS QUERY SCHEDULING AND SPLITTING IN A CLUSTER-BASED DATA STORAGE SYSTEM

(71) Applicant: EMC IP Holding Company LLC, Hopkinton, MA (US)

(72) Inventors: Mikhail Danilov, Saint Petersburg (RU); Maksim Vazhenin, Saint Petersburg (RU)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 356 days.

(21) Appl. No.: 16/740,672

(22) Filed: Jan. 13, 2020

(65) Prior Publication Data
US 2021/0216557 A1 Jul. 15, 2021

(51) Int. Cl.
*G06F 16/2455* (2019.01)
*G06F 9/48* (2006.01)

(52) U.S. Cl.
CPC ...... *G06F 16/24568* (2019.01); *G06F 9/4881* (2013.01)

(58) Field of Classification Search
CPC .......... G06F 16/24568; G06F 9/4881

USPC ........................................... 707/755
See application file for complete search history.

(56) References Cited

U.S. PATENT DOCUMENTS

| 7,574,424 | B2* | 8/2009 | Chowdhuri | G06F 16/24532 |
| | | | | 718/107 |
| 10,198,298 | B2* | 2/2019 | Bishop | G06F 9/4881 |
| 10,592,282 | B2* | 3/2020 | Bishop | G06F 9/4881 |
| 2014/0012871 | A1* | 1/2014 | Jeon | G06F 16/24556 |
| | | | | 707/769 |
| 2020/0285514 | A1* | 9/2020 | Ghare | G06F 9/505 |

* cited by examiner

*Primary Examiner* — Robert W Beausoliel, Jr.
*Assistant Examiner* — Arthur Ganger
(74) *Attorney, Agent, or Firm* — Amin, Turocy & Watson, LLP

(57) ABSTRACT

The technology described herein is directed towards executing continuous query tasks for monitoring a data storage system to obtain real-time metrics and store query results, in which the continuous query tasks are resource-demanding yet need to execute on limited system resources. A continuous query tasks scheduler levels the load produced by scheduling continuous query tasks with starting time offsets based on the period of continuous query tasks and load descriptions for the tasks. Further, a continuous query task that produces too high of a workload is divided into continuous query subtasks, which are scheduled at subtask starting time offsets.

20 Claims, 11 Drawing Sheets

US 11,436,231 B2

CONTINUOUS QUERY SCHEDULING AND SPLITTING IN A CLUSTER-BASED DATA STORAGE SYSTEM

TECHNICAL FIELD

The subject application generally relates to data storage, and, for example, to arranging continuous query tasks for monitoring system metrics, and related embodiments.

BACKGROUND

Cluster-based data storage systems such as ECS (formerly known as ELASTIC CLOUD STORAGE) provided by DELL EMC are able to store large amounts of data. For example, an ECS cluster has multiple nodes, and each node manages multiple storage devices (e.g. hard drives).

In general, there is a need for serviceability and monitoring statistics, which reflect the cluster's state and the progress of storage processes, to be visible to end users and to service personnel. To this end, among the storage services each node runs, there is a monitoring agent that collects and reports system metrics from the other storage services. Further, the monitoring agent has a set of its own independent probes to monitor general system state (e.g. CPU utilization, RAM consumption, etc.).

Monitoring system clients (e.g., ECS "Dashboard") may request aggregated metrics for some time window. Metrics aggregation can be a resource-intensive operation, corresponding to high latency for such requests; when such requests are regularly received, the requests cause high system workload. Some monitoring systems support continuous queries to mitigate this issue, where continuous queries are queries that run automatically and periodically on real-time metrics and store query results in the form of a separate metrics. Requests for aggregated metrics are served using results of continuous queries.

However, the greater the period of a continuous query, the greater the amount of data to read and process. Some complex systems use external hardware resources (hosts) for such monitoring operations. However, when monitoring is performed by a built-in component, as in ECS, there is only a relatively small amount of system resources that can be reserved for monitoring. In ECS, executing continuous queries can result in destabilizing load spikes; in one scenario, execution of only three continuous query tasks with the period of one day destabilizes the monitoring subsystem.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
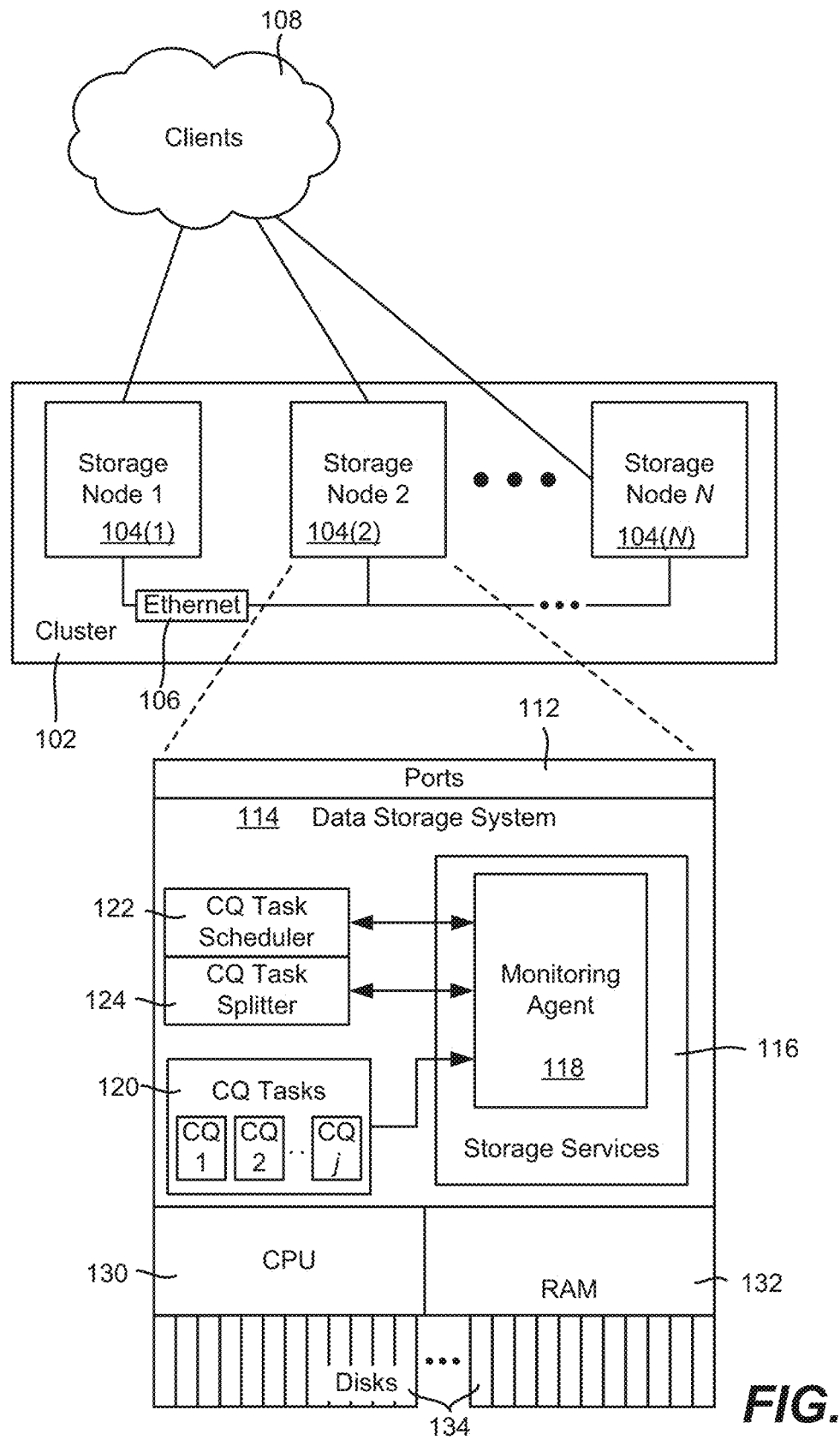
FIG. 1 is an example block diagram representation of a data storage system including nodes of a node cluster, in which continuous query tasks are scheduled for execution, in accordance with various aspects and implementations of the subject disclosure.

Various aspects of the technology described herein are generally directed towards implementing continuous query operations with a long period, in a manner that avoids destabilizing load spikes in data storage systems with limited resources reserved for monitoring. Aspects are based on continuous query task(s) scheduling and continuous query task(s) splitting.

In one aspect, continuous query task scheduling in general operates to avoid destabilizing load spikes by leveling the load produced by continuous query tasks.

Continuous query tasks scheduling is performed by the monitoring subsystem, that is, clients of the monitoring subsystem are not responsible for the scheduling of continuous query tasks.

In another aspect, continuous query task splitting generally operates to divide a continuous query task that produces too high of a load (corresponding to load spikes) into continuous query subtasks. The continuous query subtasks produce sub-results that are aggregated to produce a continuous query task result. As will be understood, continuous query task splitting can be based on a scope of work for a continuous query task that can be described using a time window that can be divided into sub-windows, and/or based on the cardinality of the continuous query task.

As is understood, the implementation(s) described herein are non-limiting examples, and variations to the technology can be implemented. For instance, some of the examples are based on ECS data storage technology; however virtually any system that needs monitoring with only limited system resources reserved for monitoring may benefit from the technology described herein. Thus, any of the embodiments, aspects, concepts, structures, functionalities or examples described herein are non-limiting, and the technology may be used in various ways that provide benefits and advantages in computing, continuous query-based monitoring and data storage in general.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows part of a cloud data storage system such as ECS comprising a cluster 102 of storage nodes 104(1)-104(N), in which each node is typically a server configured primarily to serve objects in response to client requests. The nodes 104(1)-104(N) are coupled to each other via a suitable data communications link comprising interfaces and protocols, such as represented in FIG. 1 by Ethernet block 106.

Clients 108 make data system-related requests to the cluster 102, which in general is configured as one large object namespace; there may be on the order of billions of objects maintained in a cluster, for example. To this end, a node such as the node 104(2) generally comprises ports 112 by which clients connect to the cloud storage system. Example ports are provided for requests via various protocols, including but not limited to SMB (server message block), FTP (file transfer protocol), HTTP/HTTPS (hypertext transfer protocol) and NFS (Network File System); further, SSH (secure shell) allows administration-related requests, for example.

In general, and in one or more implementations, e.g., ECS, disk space is partitioned into a set of relatively large blocks of typically fixed size (e.g., 128 MB) referred to as chunks; user data is generally stored in chunks, e.g., in a user data repository. Normally, one chunk contains segments of several user objects. In other words, chunks can be shared, that is, one chunk may contain segments of multiple user objects; e.g., one chunk may contain mixed segments of some number of (e.g., three) user objects.

Each node, such as the node 104(2), includes a data storage system 114 and data storage services 116; (note however that at least some data storage service components can be per-cluster, or per group of nodes, rather than per-node). For example, ECS runs a set of storage services, which together implement storage business logic.

As shown in FIG. 1, the storage services 116 on a node (such as the node 104(2)) include a monitoring agent 118. The monitoring agent 118 can run various monitoring tasks, including continuous query (CQ) tasks 120 (e.g., CQ1-CQj). As described herein, a continuous query task scheduler 122 and a continuous query task splitter 124 are coupled to or incorporated into the monitoring agent 118.

In FIG. 1, a CPU 130 and RAM 132 are shown; note that the RAM 132 may comprise at least some non-volatile RAM. The node includes storage devices such as disks 134, comprising hard disk drives and/or solid-state drives. As is understood, any node data structure such as an object, object table, chunk table, chunk, code, and the like can be in RAM 128, on disk(s) 130 or a combination of partially in RAM, partially on disk, backed on disk, replicated to other nodes and so on.

Figure 2:
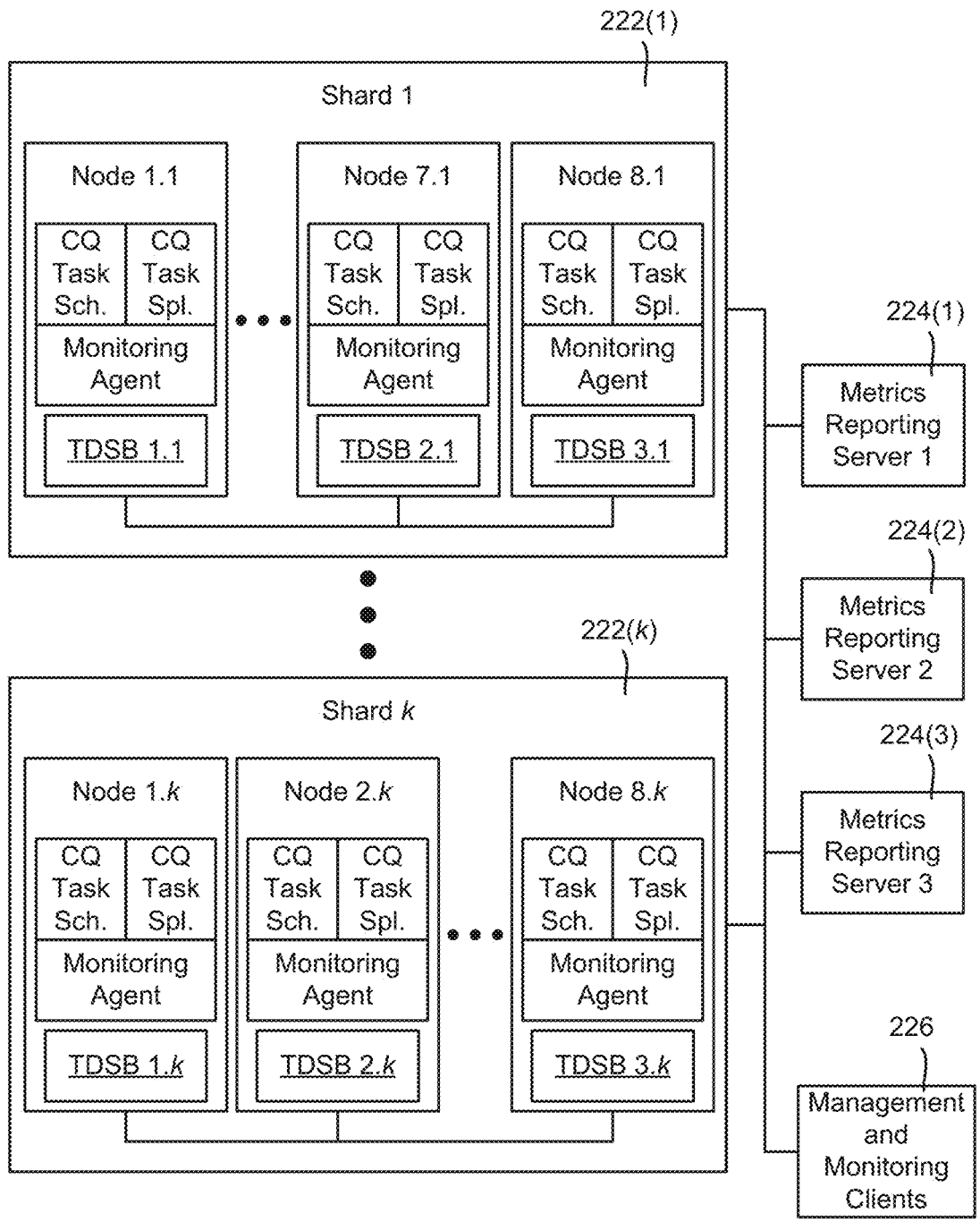
FIG. 2 is a representation of dividing monitoring components, including continuous query tasks schedulers and continuous query tasks splitters among nodes of a node cluster, in accordance with various aspects and implementations of the subject disclosure.

FIG. 2 shows one example implementation of a monitoring system, which works at the node level, a "shard" level, and the cluster level. As described herein, at the node level the monitoring agents (e.g., 118 FIG. 1) collect and report system metrics from other storage services and via monitoring agents' independent probes monitor general system state such as CPU utilization, RAM consumption, and the like). In order not to overwhelm the cluster network with small messages, each monitoring agents has an instance per cluster node and handles only local storage services.

ECS also includes a storage service that is basically a Time Series Database (TSDB) that stores and reports system metrics gathered by the node-level monitoring agents. The TSDB runs on three of the nodes in a shard (for availability, the storage service needs to tolerate the unavailability of two cluster nodes, hence three nodes are used). Monitoring agents periodically send new data to the three instances of the TSDB.

Note that to avoid overwhelming a node that runs an active instance of a TSDB with metrics reports from the monitoring agents, the cluster nodes are divided into monitoring subgroups referred to as shards. Shards 222(1)-222(k) are shown in FIG. 2, with eight nodes 1.1-8.1 in shard 222(1) and eight nodes 1.k-8.k in shard 222(k) depicted in FIG. 2; (eight nodes is the default shard size).

At the cluster level there is another storage service referred to as a metrics reporting server; three metrics reporting server instances 224(1)-224(3) are shown in FIG. 2. Note that there are at least three instances of the metrics reporting server to meet availability requirements.

The metrics reporting server storage service receives requests from ECS management and monitoring clients 226 (e.g. web-based ECS Dashboard) and handles the requests at the cluster level. The metrics reporting server instances 224(1)-224(3) may be deployed as separate HTTP/HTTPS servers. ECS management and monitoring clients are free to connect to any instance of a server. The server may implement or reuse a general purpose query language to query an ECS cluster for historical or current monitoring data. When the metrics reporting server receives a request that relates to the entire cluster, the server collects the data from the full set of shards (their TSDBs), merges the data, and sends the results to the client.

Turning to scheduling the execution of continuous query tasks, scheduling is performed by the monitoring subsystem. Note that one straightforward approach to schedule execution of continuous query tasks is to use a random offset for each continuous query type. However, while the use of random offsets provides some improvement, there are drawbacks, in that two or more continuous query tasks still can start simultaneously or almost simultaneously, and potentially valuable information about resource intensity of different continuous query types is not used.

Described herein is associating each continuous query type with three parameters, namely continuous query task period (P), query description using some language (D) and load description (L). The load description (L) parameter is not traditional, and describes the load produced by a single continuous query task in some units. There are options for the units, e.g., in ECS load produced may be described in megabytes of data to be retrieved/handled/stored by a continuous query task, because volatile memory tends to be the most critical resource for the monitoring subsystem.

In general, unlike general-purpose monitoring systems that normally have a greater amount of system resources to handle workloads, which cannot be fully predicted, dedicated systems, e.g. embedded systems, have very limited resources. In runtime, a dedicated system handles a predefined workload. A predefined workload can be analyzed statically, that is, during system development. This way, developers can ensure there are enough system resources to handle the potential workload.

The monitoring subsystem described herein has some features of dedicated systems, including that there is a very limited amount of volatile memory, which is a threat to the subsystem stability. Advantageously, future monitoring subsystem workload can be analyzed statically. The set of the monitoring subsystem's clients, comprising the other storage services, is known at the system version development stage. Load produced by continuous queries requested by the clients can be analyzed during endurance/longevity testing.

Notwithstanding, a single metrics handled by a continuous query task has a cardinality value (C), and the load produced by the task depends on cardinality. For example, load produced by a continuous query task that handles a per (hardware) node metrics is directly proportional to a number of nodes in a cluster; load produced by a continuous query task that handles a per (software) namespace metrics is directly proportional to a number of namespaces configured in a system. Metrics' cardinality is an unknown quantity at the development stage.

Described herein is determining a continuous query task's base load (l) at the development stage, where the base load is the load produced by the continuous query task when cardinality of the corresponding metrics is 1. Then, in production, load descriptions L for the continuous query task can be calculated using the base load l and the current cardinality C, as l*C. An initial schedule can be created and persisted in a non-volatile memory during first system initialization using current system parameters (Cs, set of active storage services, etc.). The schedule can be rebuilt when needed as described herein.

There are different ways to obtain load descriptions. Systems that tend to be more dynamic may analyze continuous query types at runtime to get a measure of the load they may produce. In most cases, a measure of the load is already sufficient for the scheduling purpose.

The scheduling technology described herein uses descriptions of continuous query types as an input. The output is a set of offsets for the continuous query types, where an offset is a time offset for a first continuous query task of a given continuous query type. Further continuous query tasks are to start with the required period (P).

In a first step, a greatest common divisor (G) is calculated for the continuous query periods (Pi's). Each offset to be derived in further steps will be in the range [0,G].

In a next step, an "exclusive" execution time (Ei) is calculated for each continuous query type using G and a set of load descriptions Li. Ei is a time interval between a moment a first task of i-th continuous query type starts and a moment a first task of (i+1)-th continuous query type starts. Described herein is making the exclusive execution time for a task proportional to the load produced by the task, as the more resource demanding a task is, the more time the task needs to complete. In other words, Ei is a part of G devoted to i-th continuous query type. Ei can be calculated using the equation below:

$$Ei = \frac{Li}{\sum_i Li} * G$$

In a last step, actual offsets (Oi) are calculated. Zero is the offset for the first continuous query type:

$$O1 = 0$$

The offset for each next continuous query type is calculated as a sum of an offset and an exclusive execution time of a previous continuous query type:

$$Oi = O(i-1) + E(i-1)$$

Figure 3:
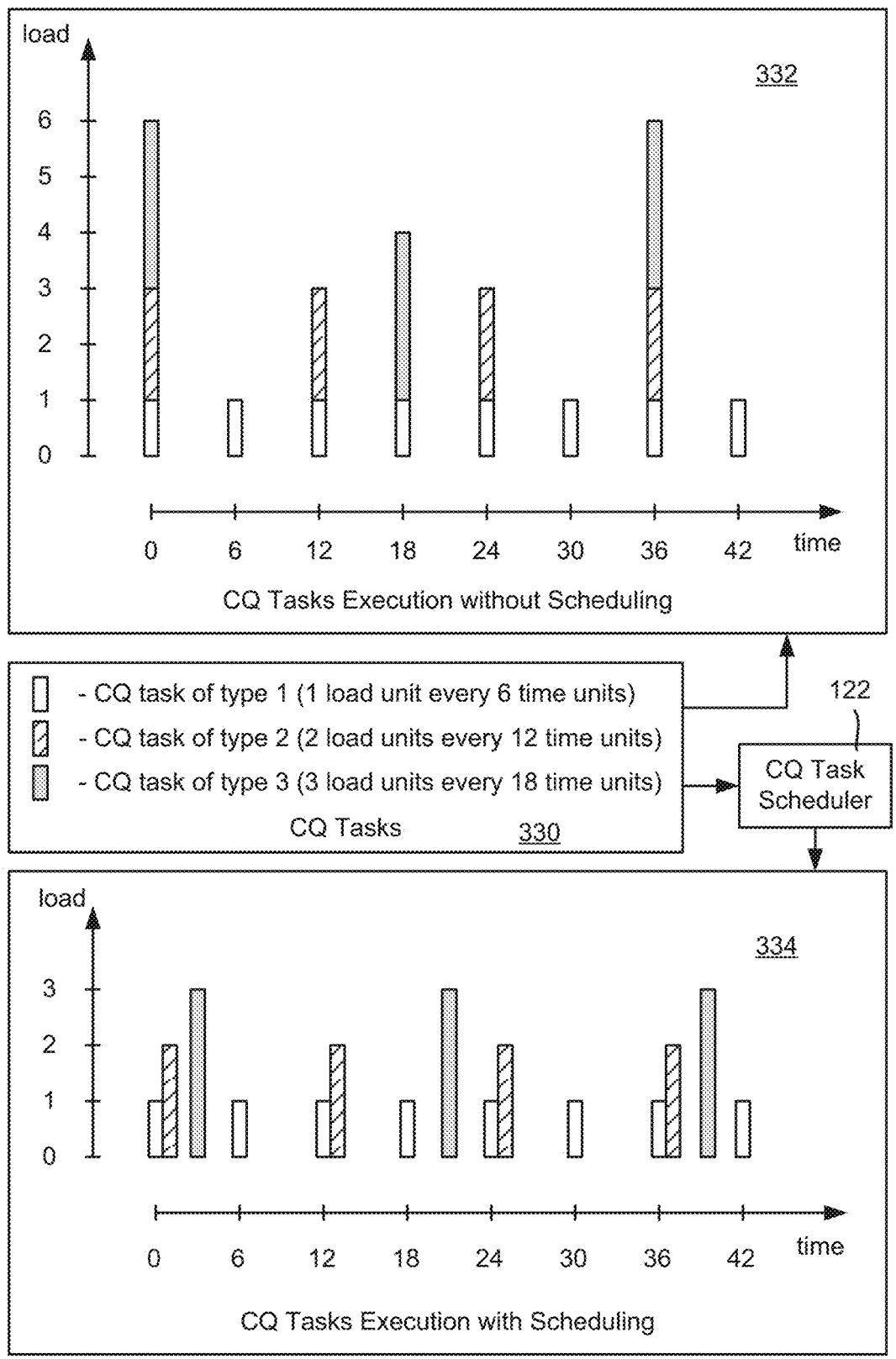
FIG. 3 is a representation of scheduling continuous query tasks at staggered offset times based on load leveling, in accordance with various aspects and implementations of the subject disclosure.

By way of example, FIG. 3 describes an example set of continuous query types 330 in a data storage system. The upper portion 332 of FIG. 3 shows how the continuous query types 330 will execute without scheduling. The lower portion 334 of FIG. 3 shows how the continuous query types 330 will execute scheduling by the continuous query task scheduler 122.

Figure 4:
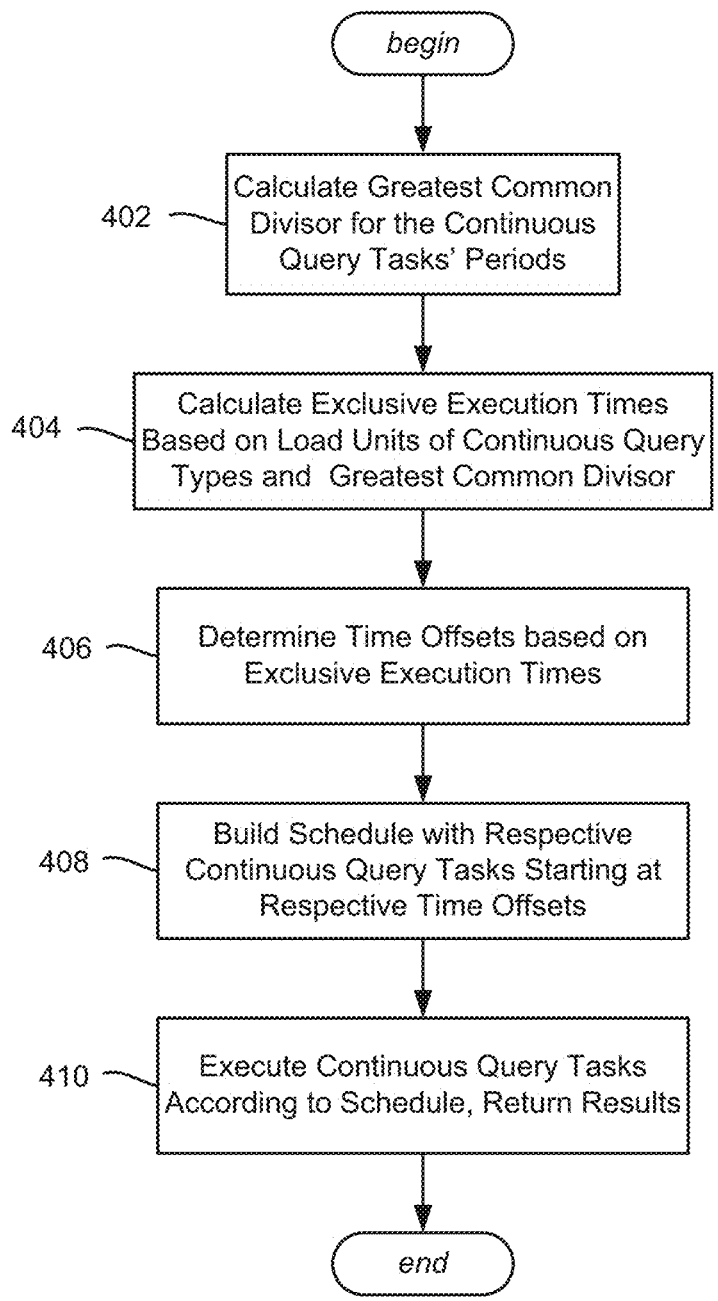
FIG. 4 is a flow diagram showing example operations related to scheduling continuous query tasks, in accordance with various aspects and implementations of the subject disclosure.

In the example, there are 3 continuous query types 330, which, when not scheduled or scheduled poorly, cause load spikes (of 6 load units) every 36 time units, which can destabilize the system. The scheduling technology described herein resolves this issue by distributing the continuous query tasks of the different continuous query types in time. The time offsets can be calculated in three operations, as generally shown in FIG. 4.

Operation 402 determines G, (the greatest common divisor for the periods Pi), which in this example is calculated as 6. Operation 404 determines the Ei'S (exclusive execution times), which are calculated to be proportional to the load units of the continuous query types and the greatest common divisor G as described above.

In this example the sum of the load units L Li is 6, the greatest common divisor G is 6, and thus Ei=Li/6*6=Li. The Ei'S are thus 1 for continuous query type 1, 2 for continuous query type 2, and 3 for continuous query type 3.

Operation 406 determines the time offsets as Oi=O(i−1)+E(i−1); accordingly, the time offsets for the continuous query types of 1, 2 and 3 (the i's) are 0, 1, and 3, respectively. Operation 408 represents building the schedule which such offset-staggered continuous query tasks, and operation 410 represents executing the continuous query tasks according to the schedule, including returning the results.

As can be seen by the lower portion 332 of FIG. 3, the continuous query task scheduler 122 changes the system load profile. Indeed, in this example the continuous query scheduler 122 reduces the height of load spikes by one-half (three instead of six).

Note that the concept of tasks scheduling does not contradict the use-cases of continuous query, which in general has "canned" intermediate products that can be used to quickly provide information based on a large amount of some raw data. Although as described herein the tasks of some continuous query types start with an offset, nothing is substantially changed, generally because no monitoring system can guarantee on-time execution of continuous query tasks; some delays are unavoidable. What is significant is that when a continuous query task starts, the continuous query task normally has a time window of size P to execute.

Described herein is building a continuous query task schedule based on current system parameters. As is understood, over time system parameters can change. For example, more nodes can be added to the cluster, another logical namespace can be configured in the system, or a set of storage services may change because, for instance, a "Transformation and Migration" service obtains some work to do. Rather than rebuilding a continuous query task schedule after such a change, rescheduling can be performed based on some criterion, such as when the total workload produced by the continuous query tasks (sum of the loads L) changes by some threshold value, e.g., ten percent. Once a new schedule is produced and activated, a next execution of a given continuous query task can start somewhat earlier or later than it originally supposed to start. This is not problematic, though, as the tasks' offsets are within the greatest common divisor (G) of the tasks' periods (Ps), whereby none of the tasks will miss its time window.

Turning to continuous query task splitting, aspects of continuous query task splitting are directed towards dividing a continuous query task that produces too high of a load into continuous query subtasks. Such division can be implemented naturally for continuous query tasks. For example, a scope of work for a continuous query task can be described using a time window of length P. This time window can be divided into sub-windows, which describe scopes of work for continuous query subtasks.

Continuous query subtasks of one continuous query task can be scheduled independently, with some delays. When executed, each continuous query subtask produces a sub-result. When the subtasks of one continuous query task have completed, the sub-results of the continuous query subtasks are aggregated to produce a continuous query task result. Again, the task splitting operations can be implemented implicitly, so that clients of the monitoring subsystem are not aware of the continuous query implementation details.

Instead of or in addition to time sub-window division, another option for splitting a continuous query task into continuous query subtasks is to use cardinality of the continuous query task. For example, if a continuous query task is to collect metrics for ten storage namespaces, the continuous query task can be divided into ten continuous query subtasks, where each subtask is to handle one namespace. Note that in complex situations, continuous query task splitting may use both time-based division and cardinality-based division to divide a continuous query task into continuous query subtasks.

In one implementation, continuous query task splitting uses a description of a continuous query type (as described herein) as input. Continuous query tasks scheduling (without splitting) is used when the tasks' load values (Ls) are not considered to be overly high, that is, each L is below some load threshold (T). Instead, if a continuous query task produces too high load above the threshold (T), continuous query task splitting generates a description of continuous query subtasks of the continuous query task of the continuous query type. This description includes the number of continuous query subtasks (N), the continuous query subtask period (p), the continuous query subtask query description (d), and a continuous query subtask load description (stl).

N is a smallest natural number that meets the limitation $L/N < T.$

By way of example, consider that there is a time window for a continuous query task to complete within (W), which, for example, may be the exclusive execution time E. This time window W needs to be divided between all continuous query subtasks equally. That is:

$p = W/N.$

Note that a first continuous query subtask starts at the moment the continuous query task, if not divided, would start. Subsequent subtasks follow with the time interval P.

Figure 5:
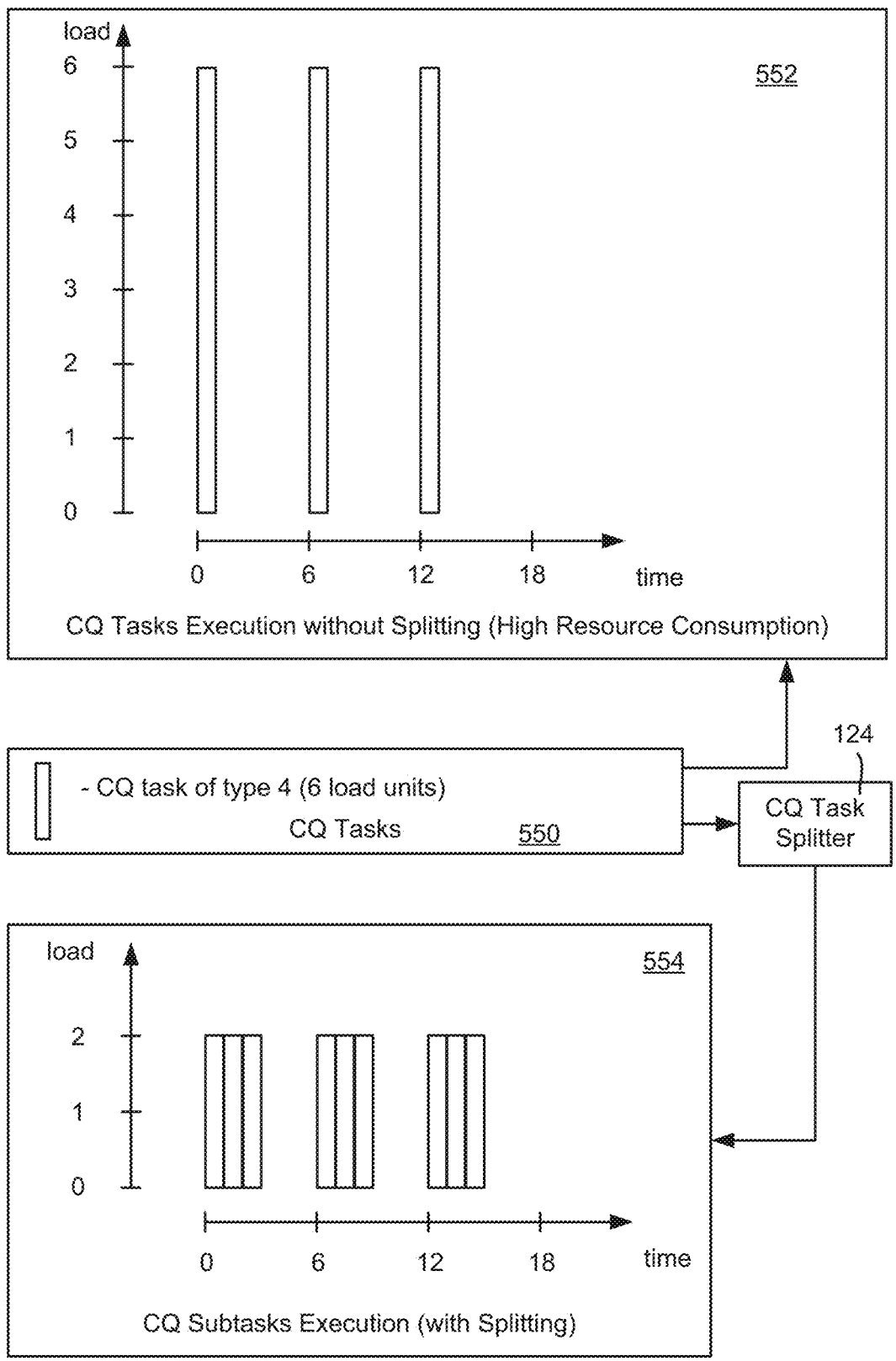
FIG. 5 is a representation of splitting a continuous query task with high load into subtasks, in accordance with various aspects and implementations of the subject disclosure.
Figure 6:
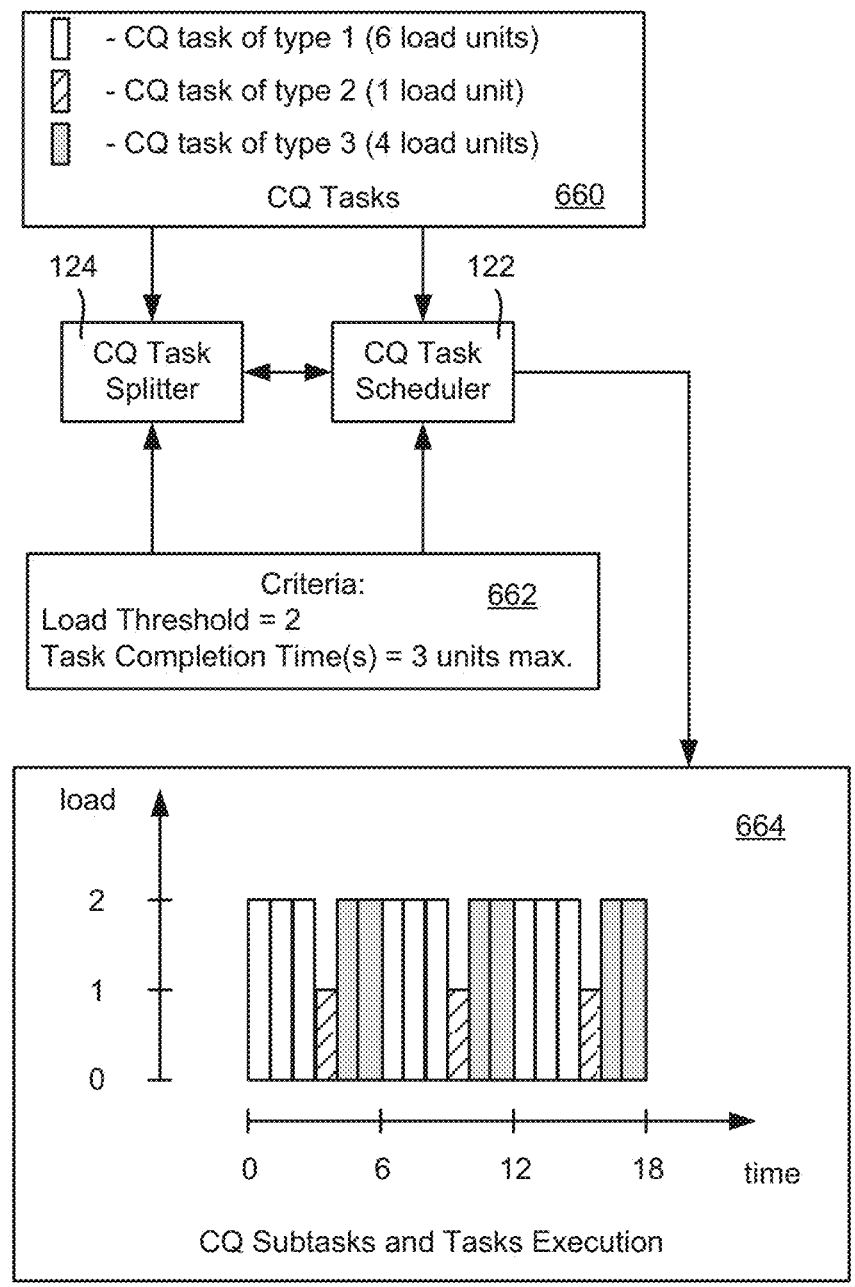
FIG. 6 is a representation of scheduling continuous query tasks and subtasks split from high load continuous query tasks, in accordance with various aspects and implementations of the subject disclosure.

The scope of a continuous query task is divided equally between continuous query subtasks. For example, consider that continuous query task splitting is implemented using a reporting time window. Then, each continuous query subtask covers a time window of size:

$s = P/N$ where P (the continuous query task period) is a size of the original time window, the time window to be covered with the continuous query task. A first subtask covers a time window that starts with the original time window, a second subtask covers a time window that starts with the offset s, and so on The continuous query subtasks' load description (stl) can be used for scheduling purposes as described herein. The load description for a continuous query subtasks can be calculated using $stl = L/N.$ By way of example, FIG. 5 below describes a continuous query task 550 with high resource consumption. In FIG. 5, the example continuous query task 550 starts every 6 time units and a task instance consumes 6 load units. Consider that in this example, the load threshold T is equal to 2 load units. Therefore, each continuous query task is divided into 3 continuous query subtasks. That is, $N = L/T = 6/2 = 3$ Further, consider that there is a constraint to complete a continuous query task within 3 time units. That is, $W = 3;$ For example, the remaining three (P−W) time units might be reserved for execution of other continuous query tasks, (as illustrated in FIG. 6). Then, $p = W/N = 3/3 = 1.$ Thus, continuous query subtasks are to follow each over every 1 time unit.

Each continuous query subtask covers a time window of size $s = P/N = 6/3 = 2.$

Each continuous query subtask produces load $stl = L/N = 6/3 = 2.$

As seen in FIG. 5 by contrasting the upper portion 552 (without continuous query task splitting) with the lower portion 554 (processed with the continuous query task splitter 124), continuous query task splitting changes the system load profile. In the example of FIG. 5, continuous query task splitting reduces the load spikes by two thirds (from six load units to two).

FIG. 6 shows an example of scheduling continuous query subtasks from a split continuous query task in conjunction with complete (non-split) continuous query tasks. In the example of FIG. 6, the same criteria (shown in block 661) for task splitting as used in the above example is again used, namely the load threshold T is 2, and the task completion time W is 3 time units maximum.

As is understood, the continuous query task of type 1 is 6 load units, and is thus divided into 3 subtasks of load 2. The continuous query task of type 2 is 1 load unit, and is thus not split. The continuous query task of type 3 is 2 load units, and is thus split into 2 subtasks of load 2. As shown by the graphical representation 664 of the schedule, the 3 subtasks of type 1 execute with 2 load units over 3 time units, followed by the task of type 2 executing with 1 load unit over 1 time unit, followed by the 2 subtasks of type 3 executing with 2 load units over 2 time units.

Figure 7:
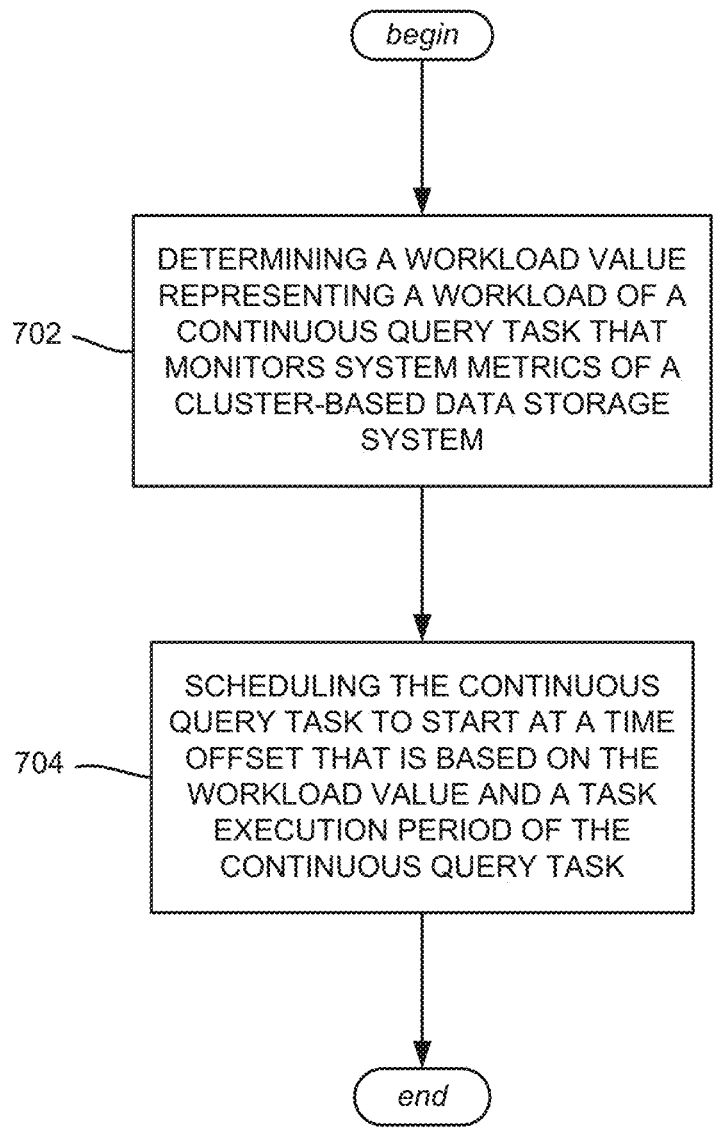
FIG. 7 is a flow diagram showing example operations related to scheduling a continuous query task based on workload, in accordance with various aspects and implementations of the subject disclosure.

One or more aspects are represented in FIG. 7, such as of a system comprising a processor, and a memory that stores executable instructions that, when executed by the processor, facilitate performance of operations. Operation 702 represents determining a workload value representing a workload of a continuous query task that monitors system metrics of a cluster-based data storage system. Operation 704 represents scheduling the continuous query task to start at a time offset that is based on the workload value and a task execution period of the continuous query task.

Determining the workload value can comprise determining a base load value of the continuous query task during a development stage with a cardinality value of corresponding metrics equal to one. Determining the workload value can comprise multiplying the base load value times a current cardinality value of the continuous query task.

The continuous query task can be a first continuous query task, the time offset can be a first time offset, and further operations can comprise scheduling a second continuous query task to start at a second time offset that is after the task execution period of the first continuous query task.

The task execution period of the continuous query task can be a first task execution period, and further operations can comprise determining the second time offset based on a greatest common divisor of the first task execution period and a second task execution period of the second continuous query task.

The continuous query task can be a first continuous query task, and further operations can comprise splitting a second continuous query task corresponding to a work scope time window into continuous query subtasks, wherein the splitting the second continuous query task can comprise dividing the work scope time window into respective time subwindows associated with respective continuous query subtasks.

The continuous query task can be a first continuous query task, and further operations can comprise splitting a second continuous query task into continuous query subtasks, and scheduling respective continuous query subtasks to start at respective time offsets that are after the task execution period of the first continuous query task.

Splitting the second continuous query task can comprise dividing the second continuous query task into sub-tasks based on a cardinality value of the second continuous query task.

Further operations can comprise executing the sub-tasks to produce sub-results, and aggregating the sub-results into a continuous query task result for the second continuous query task.

Splitting the second continuous query task can comprise dividing the second continuous query task into sub-tasks based on a cardinality value of the second continuous query task and based on a work scope time window of the second continuous query task.

The continuous query task can be part of a group of continuous query tasks, and further operations can comprise detecting a total workload change value of the group of continuous query tasks, determining whether the total workload change value exceeds a threshold change value, and, in response to the determining that the total workload change value exceeds the threshold change value, building a new schedule for the group of continuous query tasks.

Figure 8:
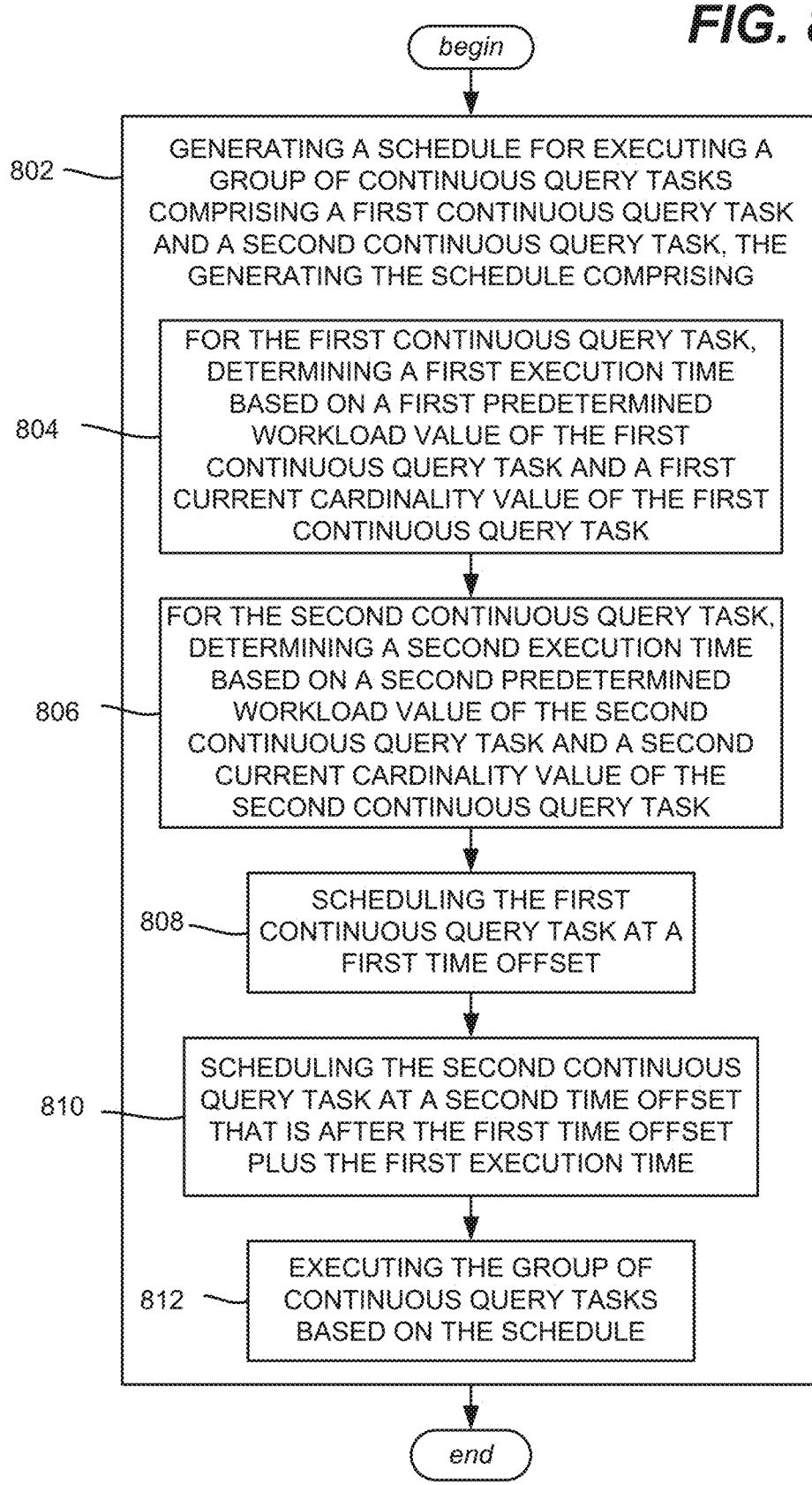
FIG. 8 is a flow diagram showing example operations related to scheduling first and second continuous query tasks at different offset starting times, in accordance with various aspects and implementations of the subject disclosure.

One or more aspects are represented in FIG. 8, such as example operations of a method. Operation 802 represents generating a schedule for executing a group of continuous query tasks comprising a first continuous query task and a second continuous query task. Generating the schedule comprises operations 804-812. Operation 804 represents or the first continuous query task, determining a first execution time based on a first predetermined workload value of the first continuous query task and a first current cardinality value of the first continuous query task. Operation 806 represents for the second continuous query task, determining a second execution time based on a second predetermined workload value of the second continuous query task and a second current cardinality value of the second continuous query task. Operation 808 represents scheduling the first continuous query task at a first time offset. Operation 810 represents scheduling the second continuous query task at a second time offset that is after the first time offset plus the first execution time. Operation 812 represents executing the group of continuous query tasks based on the schedule.

The group of continuous query tasks further can comprise a third continuous query task; generating the schedule can comprise determining a third execution time for the third continuous query task based on a third predetermined workload value of the third continuous query task and a third current cardinality value of the third continuous query task, and scheduling the third continuous query task at a third time offset that is after the second time offset plus the second execution time.

Scheduling the first continuous query task at the first time offset can comprise scheduling a first instance of the first continuous query task; aspects can comprise scheduling a second instance of the first continuous query task at a fourth time offset that is after the third time offset plus the third execution time.

Aspects can comprise splitting the second continuous query task into a group of subtasks, wherein the second execution time is divided into subtask execution times based on the number of subtasks; scheduling the second continuous query task at the second time offset can comprise scheduling respective subtasks at respective subtask execution times that are successively arranged within the second execution time.

Figure 9:
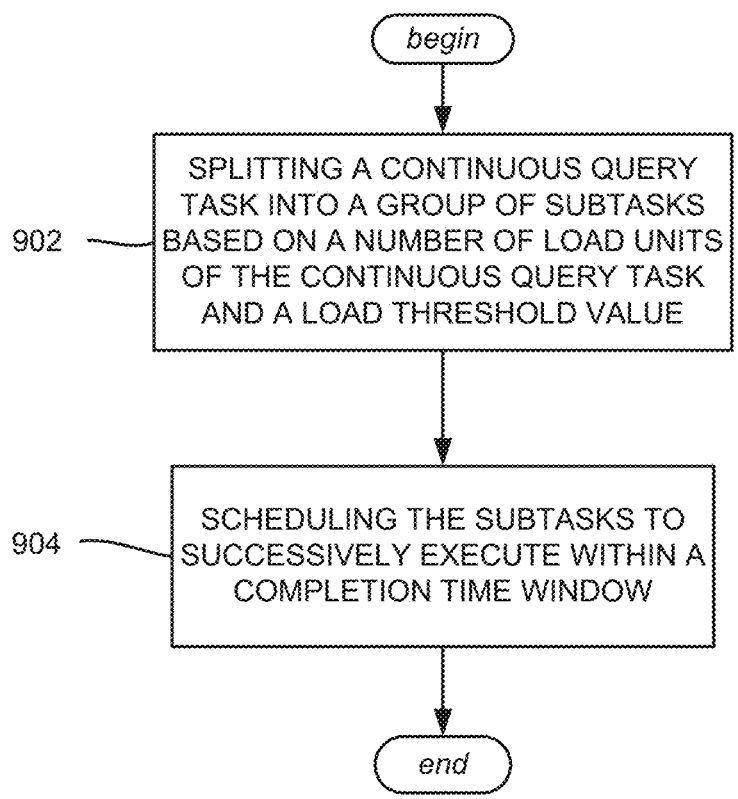
FIG. 9 is a flow diagram showing example operations related to splitting a continuous query task into subtasks, and scheduling the subtasks at different offset starting times, in accordance with various aspects and implementations of the subject disclosure.

One or more aspects, such as implemented in a machine-readable storage medium, comprising executable instructions that, when executed by a processor of a first node device of a cluster of node devices, facilitate performance of operations, can be directed towards operations exemplified in FIG. 9. Example operation 902 represents splitting a continuous query task into a group of subtasks based on a number of load units of the continuous query task and a load threshold value. Example operation 904 represents scheduling the subtasks to successively execute within a completion time window.

Splitting the continuous query task can occur in response to determining that a load value of the continuous query task is above the load threshold value.

The continuous query task can be a first continuous query task, and further operations can comprise scheduling a second continuous query task to execute after the completion time window.

The second continuous query task can execute within a second completion time window, and further operations can comprise scheduling a third continuous query task execute after the second completion time window.

Splitting the continuous query task can comprise dividing the second continuous query into the group of subtasks based on at least one of: a cardinality value of the continuous query task, or a work scope time window of the continuous query task.

As can be seen, described herein is a technology that facilitates the implementation of continuous queries with arbitrary periods without overwhelming a monitoring subsystem. As exemplified herein, the scheduling and/or task splitting technologies can accomplish this in systems in which monitoring is performed by a built-in component with relatively small amount of system resources reserved for monitoring. The technology is practical to implement.

Figure 10:
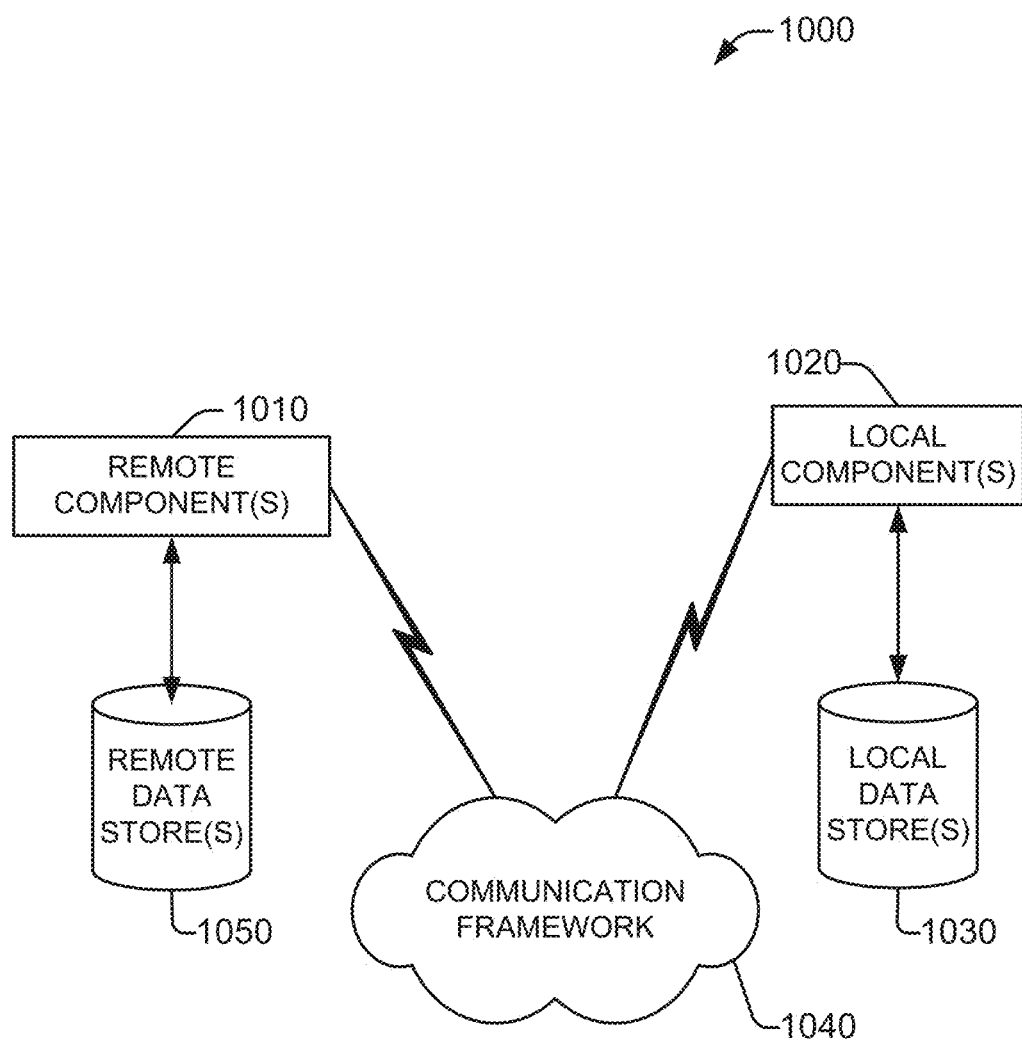
FIG. 10 depicts an example schematic block diagram of a computing environment with which the disclosed subject matter can interact.

FIG. 10 is a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can be a distributed computer system, connected to a local automatic scaling component and/or programs that use the resources of a distributed computer system, via communication framework 1040. Communication framework 1040 can comprise wired network devices, wireless network devices, mobile devices, wearable devices, radio access network devices, gateway devices, femtocell devices, servers, etc.

The system 1000 also comprises one or more local component(s) 1020. The local component(s) 1020 can be hardware and/or software (e.g., threads, processes, computing devices). In some embodiments, local component(s) 1020 can comprise an automatic scaling component and/or programs that communicate/use the remote resources 1010 and 1020, etc., connected to a remotely located distributed computing system via communication framework 1040.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

Figure 11:
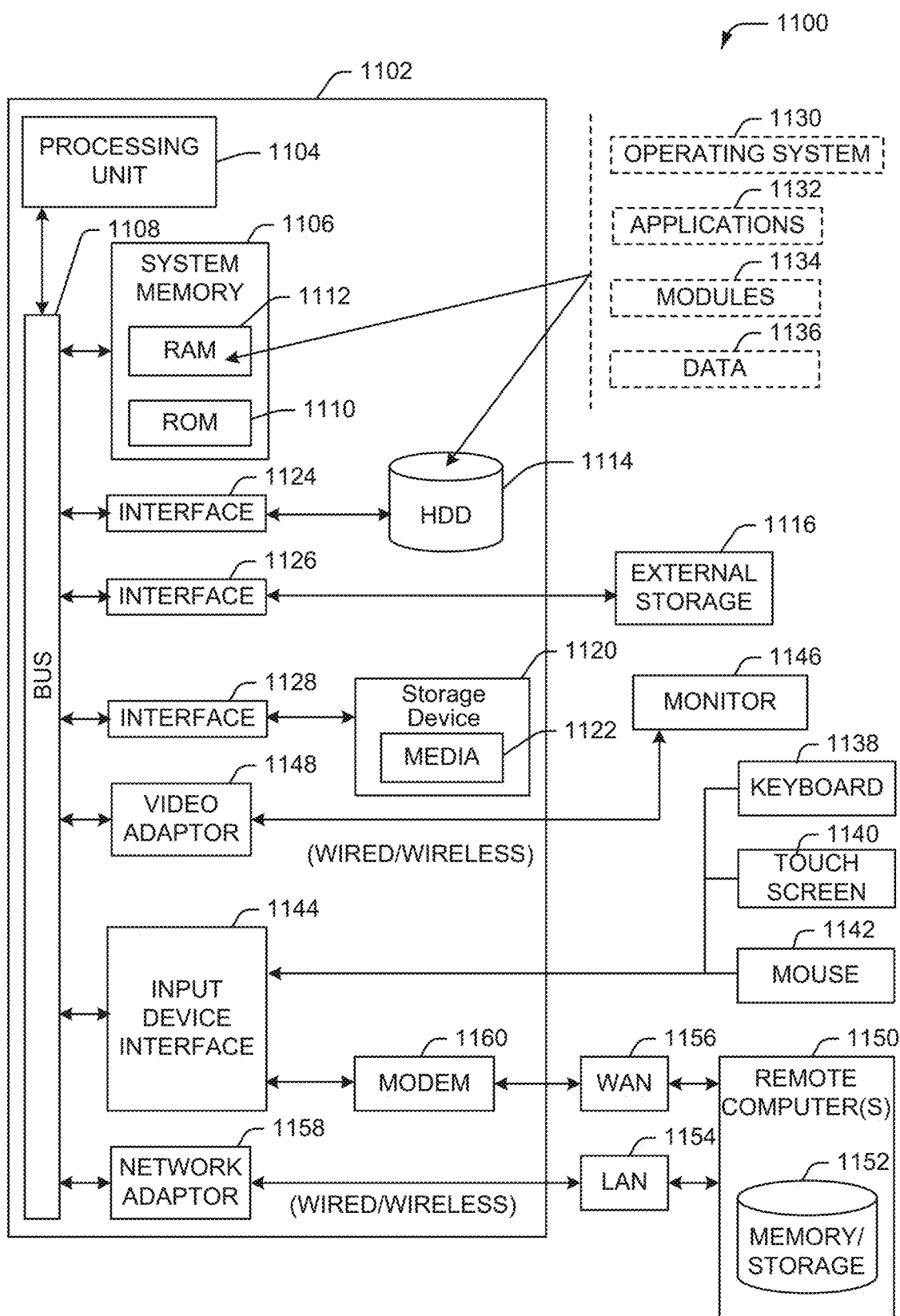
FIG. 11 illustrates an example block diagram of a computing system operable to execute the disclosed systems and methods in accordance with various aspects and implementations of the subject disclosure.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), and can include one or more external storage devices 1116 (e.g., a magnetic floppy disk drive (FDD) 1116, a memory stick or flash drive reader, a memory card reader, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114.

Other internal or external storage can include at least one other storage device 1120 with storage media 1122 (e.g., a solid state storage device, a nonvolatile memory device, and/or an optical disk drive that can read or write from removable media such as a CD-ROM disc, a DVD, a BD, etc.). The external storage 1116 can be facilitated by a network virtual machine. The HDD 1114, external storage device(s) 1116 and storage device (e.g., drive) 1120 can be connected to the system bus 1108 by an HDD interface 1124, an external storage interface 1126 and a drive interface 1128, respectively.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations.

That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather is to be construed in breadth, spirit and scope in accordance with the appended claims.

What is claimed is:

1. A system, comprising:
a processor, and
a memory that stores executable instructions that, when executed by the processor, facilitate performance of operations, the operations comprising:
determining a workload value representing a workload of a continuous query task that monitors system metrics of a cluster-based data storage system, wherein a first portion of the system metrics are captured by monitoring agents from other storage services other than storage services provided by the cluster-based data storage system, and wherein a second portion of the system metrics are captured by probe monitoring a state of the system; and
scheduling the continuous query task to start at a time offset that is based on the workload value and a task execution period of the continuous query task.

2. The system of claim 1, wherein the determining the workload value comprises determining a base load value of the continuous query task during a development stage with a cardinality value of corresponding metrics equal to one.

3. The system of claim 2, wherein the determining the workload value comprises multiplying the base load value times a current cardinality value of the continuous query task.

4. The system of claim 1, wherein the continuous query task is a first continuous query task, wherein the time offset is a first time offset, and wherein the operations further comprise scheduling a second continuous query task to start at a second time offset that is after the task execution period of the first continuous query task.

5. The system of claim 4, wherein the task execution period of the continuous query task is a first task execution period, and wherein the operations further comprise determining the second time offset based on a greatest common divisor of the first task execution period and a second task execution period of the second continuous query task.

6. The system of claim 1, wherein the continuous query task is a first continuous query task, and wherein the operations further comprise splitting a second continuous query task corresponding to a work scope time window into continuous query subtasks, wherein the splitting the second continuous query task comprises dividing the work scope time window into respective time sub-windows associated with respective continuous query subtasks.

7. The system of claim 1, wherein the continuous query task is a first continuous query task, and wherein the operations further comprise splitting a second continuous query task into continuous query subtasks, and scheduling respective continuous query subtasks to start at respective time offsets that are after the task execution period of the first continuous query task.

8. The system of claim 7, wherein the splitting the second continuous query task comprises dividing the second continuous query task into sub-tasks based on a cardinality value of the second continuous query task.

9. The system of claim 7, wherein the operations further comprise executing the sub-tasks to produce sub-results, and aggregating the sub-results into a continuous query task result for the second continuous query task.

10. The system of claim 7, wherein the splitting the second continuous query task comprises dividing the second continuous query task into sub-tasks based on a cardinality value of the second continuous query task and based on a work scope time window of the second continuous query task.

11. The system of claim 1, wherein the continuous query task is part of a group of continuous query tasks, and wherein the operations further comprise detecting a total workload change value of the group of continuous query tasks, determining whether the total workload change value exceeds a threshold change value, and, in response to the determining that the total workload change value exceeds the threshold change value, building a new schedule for the group of continuous query tasks.

12. A method comprising,
generating, by a system comprising a processor, a schedule for executing a group of continuous query tasks comprising a first continuous query task and a second continuous query task, the generating the schedule comprising:
for the first continuous query task, determining, by the processor, a first execution time based on a first predetermined workload value of the first continuous query task and a first current cardinality value of the first continuous query task, wherein the first predetermined workload value is based on first system metrics captured by monitoring agents from other storage services, and second system metrics captured by probe monitoring of a state of the system; and
for the second continuous query task, determining, by the processor, a second execution time based on a second predetermined workload value of the second continuous query task and a second current cardinality value of the second continuous query task;
scheduling, by the processor, the first continuous query task at a first time offset; and
scheduling, by the processor, the second continuous query task at a second time offset that is after the first time offset plus the first execution time; and
executing, by the processor, the group of continuous query tasks based on the schedule.

13. The method of claim 12, wherein the group of continuous query tasks further comprises a third continuous query task, and wherein the generating the schedule further comprises determining a third execution time for the third continuous query task based on a third predetermined workload value of the third continuous query task and a third current cardinality value of the third continuous query task, and scheduling the third continuous query task at a third time offset that is after the second time offset plus the second execution time.

14. The method of claim 13, wherein the scheduling the first continuous query task at the first time offset comprises scheduling, by the processor, a first instance of the first continuous query task, and further comprising scheduling a second instance of the first continuous query task at a fourth time offset that is after the third time offset plus the third execution time.

15. The method of claim 12, further comprising splitting, by the processor, the second continuous query task into a group of subtasks, wherein the second execution time is divided into subtask execution times based on the number of subtasks, and wherein the scheduling the second continuous query task at the second time offset comprises scheduling respective subtasks at respective subtask execution times that are successively arranged within the second execution time.

16. A non-transitory machine-readable medium, comprising executable instructions that, when executed by a processor, facilitate performance of operations, the operations comprising:

splitting a continuous query task into a group of subtasks based on a number of load units of the continuous query task and a load threshold value, wherein the number of load units is determined from first system metrics, captured by monitoring agents from other storage services, and second system metrics, captured by probe monitoring of a system state that is selected from a group of states of the system comprising a central processing unit utilization state, and a random access memory consumption state; and scheduling the subtasks to successively execute within a completion time window.

17. The non-transitory machine-readable medium of claim 16, wherein the splitting the continuous query task occurs in response to determining that a load value of the continuous query task is above the load threshold value.

18. The non-transitory machine-readable medium of claim 16, wherein the continuous query task is a first continuous query task, and wherein the operations further comprise scheduling a second continuous query task to execute after the completion time window.

19. The non-transitory machine-readable medium of claim 16, wherein the second continuous query task executes within a second completion time window, and wherein the operations further comprise scheduling a third continuous query task execute after the second completion time window.

20. The non-transitory machine-readable medium of claim 16, wherein the splitting the continuous query task comprises dividing the second continuous query into the group of subtasks based on at least one of: a cardinality value of the continuous query task, or a work scope time window of the continuous query task.

* * * * *